United States Patent
Park et al.

(10) Patent No.: US 12,278,668 B2
(45) Date of Patent: Apr. 15, 2025

(54) METHOD FOR DYNAMIC ORIENTATION-CHANGE BASED OVER-THE-AIR TESTING OF BEAMFORMING PERFORMANCE

(71) Applicant: QUALCOMM Incorporated, San Diego, CA (US)

(72) Inventors: Changhwan Park, San Diego, CA (US); Bin Han, Beijing (CN); Vijay Balasubramanian, San Diego, CA (US); Mihir Vijay Laghate, San Diego, CA (US); Valentin Alexandru Gheorghiu, Yokohama (JP); Arash Mirbagheri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 17/758,817

(22) PCT Filed: Feb. 13, 2020

(86) PCT No.: PCT/CN2020/075004
§ 371 (c)(1),
(2) Date: Jul. 14, 2022

(87) PCT Pub. No.: WO2021/159367
PCT Pub. Date: Aug. 19, 2021

(65) Prior Publication Data
US 2023/0040605 A1 Feb. 9, 2023

(51) Int. Cl.
| H04B 17/12 | (2015.01) |
| H04B 17/17 | (2015.01) |
| H04B 17/26 | (2015.01) |
| H04W 24/10 | (2009.01) |

(52) U.S. Cl.
CPC ............. H04B 17/12 (2015.01); H04B 17/17 (2015.01); H04B 17/26 (2015.01); H04W 24/10 (2013.01)

(58) Field of Classification Search
CPC ....... H04W 24/10; H04B 17/26; H04B 17/17; H04B 17/12
(Continued)

(56) References Cited

U.S. PATENT DOCUMENTS

| 10,498,425 B2 | 12/2019 | Kutz et al. | |
| 2013/0271317 A1* | 10/2013 | Goel | G01S 19/23 |
| | | | 342/357.62 |

(Continued)

FOREIGN PATENT DOCUMENTS

| CN | 104105122 A | 10/2014 |
| CN | 107064861 A | 8/2017 |

(Continued)

OTHER PUBLICATIONS

Ericsson, et al., "Beam Correspondence during initital Access and Relation to OL Power Control," TSG-RAN Working Group 4 (Radio) meeting #92bis, R4-1911549, Aug. 14-18, 2019 (Aug. 18, 2019) pp. 1-7, 9 pages.

(Continued)

*Primary Examiner* — Peter G Solinsky
(74) *Attorney, Agent, or Firm* — Dinsmore & Shohl LLP

(57) ABSTRACT

Embodiments include methods of testing wireless devices for beam forming performance. Various aspects may include determining measurements of communication performance of the wireless device at each of a number of different angular orientations of the wireless device with respect to an antenna within a test chamber, and determining whether the wireless device satisfies beam forming performance requirements by comparing the measurements of communication (Continued)

performance to pass/fail criteria. Further embodiments may include a wireless device testing apparatus configured to perform testing wireless devices for beam forming performance. In some embodiments, a wireless device testing apparatus may include a test chamber, an antenna within the test chamber, a rotatable positioning system within the test chamber configured to hold a wireless device and rotate the wireless device within a range of orientations with respect to the antenna, and a computing device coupled to the antenna and the rotatable positioning system.

32 Claims, 10 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2014/0266870 A1* | 9/2014 | Koduru | H04B 7/1851 |
| | | | 342/354 |
| 2014/0355467 A1* | 12/2014 | Seol | H04B 7/0686 |
| | | | 370/278 |
| 2017/0005708 A1 | 1/2017 | Bhat et al. | |
| 2017/0279546 A1* | 9/2017 | McGarry | H04B 7/0452 |
| 2019/0288780 A1 | 9/2019 | Rodriguez-Herrera et al. | |

FOREIGN PATENT DOCUMENTS

| | | |
|---|---|---|
| CN | 108966264 A | 12/2018 |
| WO | 2018128950 A2 | 7/2018 |
| WO | 2018191575 A1 | 10/2018 |

OTHER PUBLICATIONS

Ericsson, et al., "Test Configuration for Beam Correspondence during Initital Access," TSG-RAN Working Group 4 (Radio) meeting #93, R4-1914142, Nov. 18-22, 2019 (Nov. 22, 2019) pp. 1-5, 6 pages.
International Search Report and Written Opinion—PCT/CN2020/075004—ISA/EPO—Nov. 25, 2020; 9 pages.
Supplementary European Search Report—EP20918423—Search Authority—The Hague—Oct. 9, 2023 7 pages.

* cited by examiner

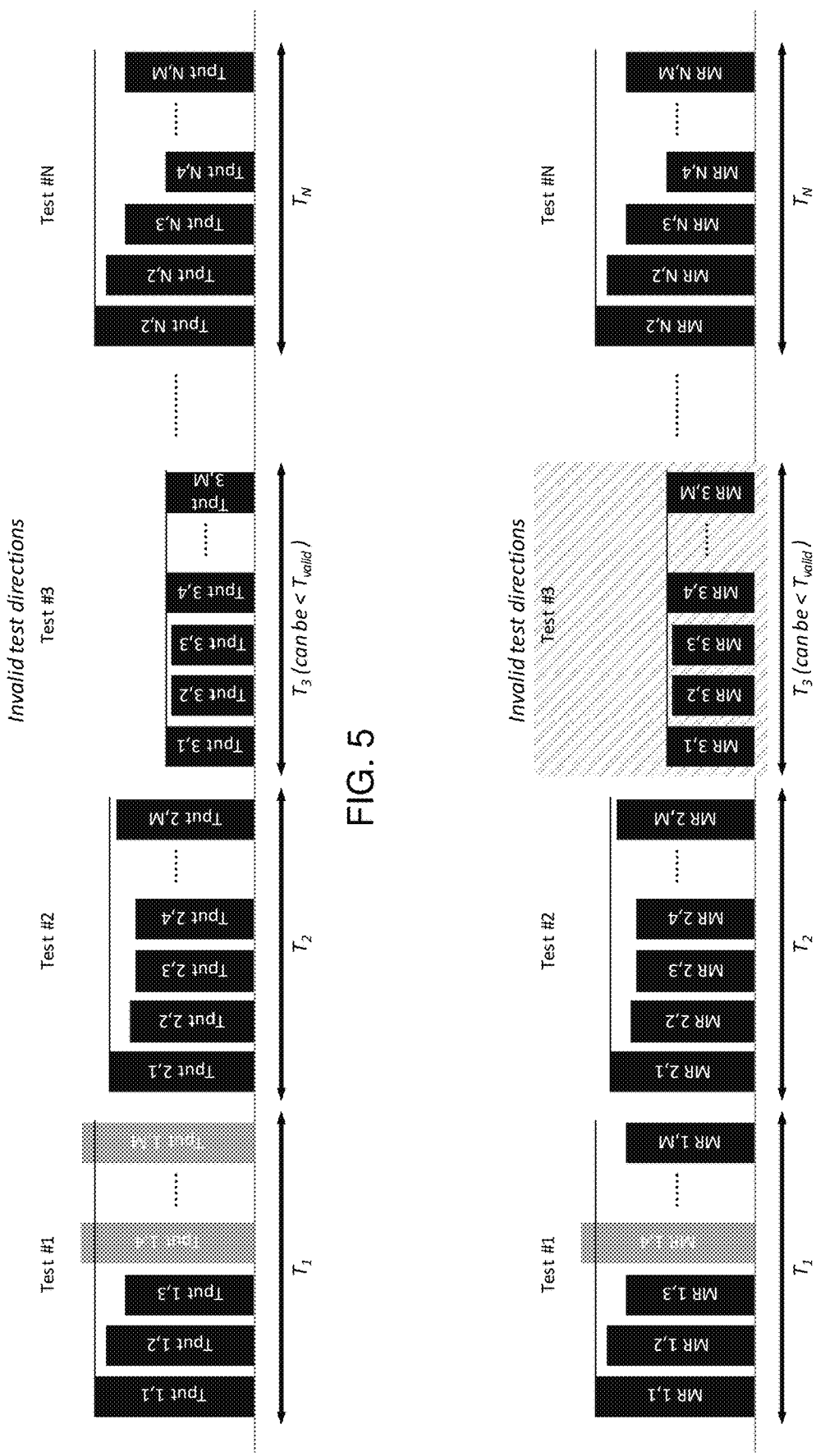

METHOD FOR DYNAMIC ORIENTATION-CHANGE BASED OVER-THE-AIR TESTING OF BEAMFORMING PERFORMANCE

BACKGROUND

One of the key enablers for high throughput of data for Frequency Range 2 in fifth generation (5G) wireless devices is beamforming in which radio frequency signals are applied to multiple antennas on the wireless device with a phase relationship that results in reinforcement of radio waves in a relatively narrow beams that can be directed towards a particular base station. During operation, wireless devices are required to manage the direction of beams to maintain radio links with a base station as the wireless device moves through the environment. As wireless devices are typically handheld and users are often moving while communicating on their devices, beamforming capabilities of wireless devices must be capable of shifting the direction of beams to maintain a radio link with the base station as the location and orientation of the wireless device changes.

Current standards for wireless communication devices require that wireless devices (sometimes referred to as user equipment) be tested in over the air test chambers. Thus, the beamforming capabilities of wireless devices will be tested in over the air test chambers. However, current test procedures defined in 3rd Generation Partnership Project (3GPP) standards require that once the wireless device orientation is established, that orientation must remain the same during the entire test. This limits the effectiveness of testing that will be required for assessing the beamforming capabilities of wireless devices.

SUMMARY

Various aspects include methods of testing wireless devices for beam forming performance. Various aspects may include determining measurements of communication performance of the wireless device at each of a number of different angular orientations of the wireless device with respect to an antenna within a test chamber, and determining whether the wireless device satisfies beam forming performance requirements by comparing the measurements of communication performance to pass/fail criteria.

In some aspects, determining measurements of communication performance of the wireless device at each of a number of different angular orientations of the wireless device with respect to an antenna within a test chamber may include conducting a series of measurements of communication performance of the wireless device at a given angular orientation of the wireless device with respect to the antenna within the test chamber, rotating the wireless device to a new angular orientation with respect to the antenna within the test chamber, and repeating the operations of conducting the series of measurements of communication performance and rotating the wireless device to a new angular orientation until measurements of communication performance have been conducted at all angular orientations at which wireless device testing is planned.

In some aspects, the series of measurements of communication performance may include a series of measurements of multiple input multiple output (MIMO) throughput, and comparing the measurements of communication performance to pass/fail criteria may include one or more of comparing a standard deviation of the measurements of MIMO throughput to a pass/fail threshold, comparing a minimum of the measurements of MIMO throughput to a pass/fail threshold, comparing a mean of the measurements of MIMO throughput to a pass/fail threshold, determining a cumulative density function from the measurements of MIMO throughput and determining whether the wireless device can statistically achieve a MIMO throughput better than a threshold percentage of a maximum throughput, determining whether a number of communication link/beam failure events that occurred between rotations of the wireless device exceeds a threshold, or determining a distribution of a difference between MIMO throughput before and after rotations of the wireless device to a new angular orientation with respect to the antenna within the test chamber.

In some aspects, the series of measurements of communication performance may include a series of measurements of link quality, and comparing the measurements of communication performance to pass/fail criteria may include one or more of comparing an absolute accuracy for link quality measurements to a pass/fail threshold, comparing a standard deviation of the measurements of link quality to a pass/fail threshold, comparing a minimum of the measurements of link quality to a pass/fail threshold, comparing a mean of the measurements of link quality to a pass/fail threshold, determining a cumulative density function from the measurements of link quality and determining whether the wireless device can statistically achieve a link quality better than a threshold percentage of a maximum link quality, determining whether a number of communication link/beam failure events that occurred between rotations of the wireless device exceeds a threshold, or determining a distribution of a difference between link quality measured before and after rotations of the wireless device to a new angular orientation with respect to the antenna within the test chamber.

Some aspects may further include performing pretesting of the wireless device to determine valid test orientations, and conducting an attachment procedure on the wireless device to establish an initial antenna beam between the wireless device and the test antenna within the test chamber. In some aspects, rotating the wireless device to a new angular orientation with respect to the antenna within the test chamber may include rotating the wireless device to a valid test orientation as determined during the pretesting of the wireless device. Some aspects may further include determining whether an angular orientation of the wireless device with respect to the antenna within the test chamber is a valid test orientation, conducting the series of measurements of communication performance of the wireless device at the angular orientation of the wireless device with respect to the antenna within the test chamber in response to determining that the angular orientation of the wireless device with respect to the antenna within the test chamber is a valid test orientation, and rotating the wireless device to a new angular orientation with respect to the antenna within the test chamber without measuring communication performance in response to determining that the angular orientation of the wireless device with respect to the antenna within the test chamber is not a valid test orientation. Some aspects may further include determining whether any series of measurements of communication performance of the wireless device was obtained with the wireless device in an invalid test orientation with respect to the test antenna, and not considering the series of measurements of communication performance of the wireless device taken invalid test orientation with respect to the test antenna when determining whether the wireless device satisfies beam forming performance requirements.

Further aspects may include a test chamber, an antenna within the test chamber, a rotatable positioning system within the test chamber configured to hold a wireless device and rotate the wireless device within a range of orientations with respect to the antenna, and a computing device coupled to the antenna and the rotatable positioning system, and configured with processor executable instructions to perform operations of any of the methods summarized above. Further aspects may include a non-transitory processor-readable storage medium having stored thereon processor-executable instructions configured to cause a computing device of a wireless device testing apparatus to perform operations of any of the methods summarized above. Further aspects include wireless device testing apparatus for testing wireless device beam forming performance having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 5 is a diagram illustrating multiple input multiple output (MIMO) throughput test measurements at the series of wireless device orientations in accordance with various embodiments.

FIG. 6 is a diagram illustrating link quality test measurements at the series of wireless device orientations in accordance with various embodiments.

DETAILED DESCRIPTION

Figure 1A:
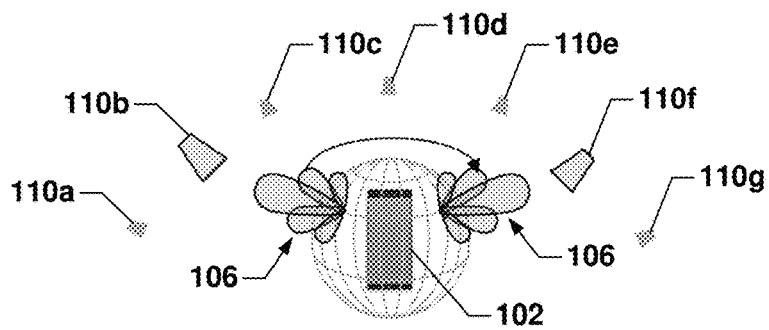
FIGS. 1A-1D are diagrams illustrating testing of beamforming capabilities of a wireless device according to current standard over the air testing of wireless devices.
Figure 1B:
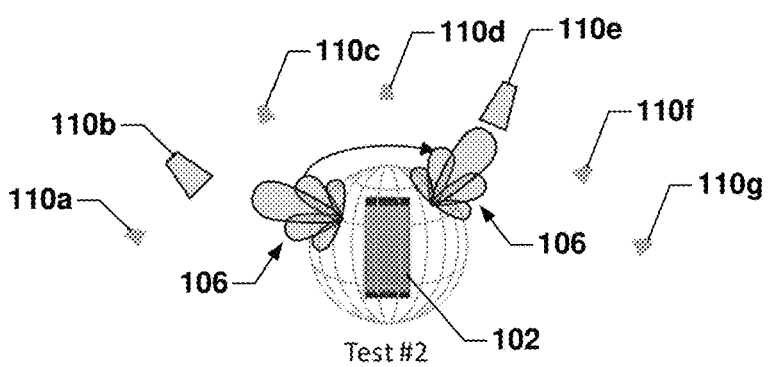
Figure 1C:
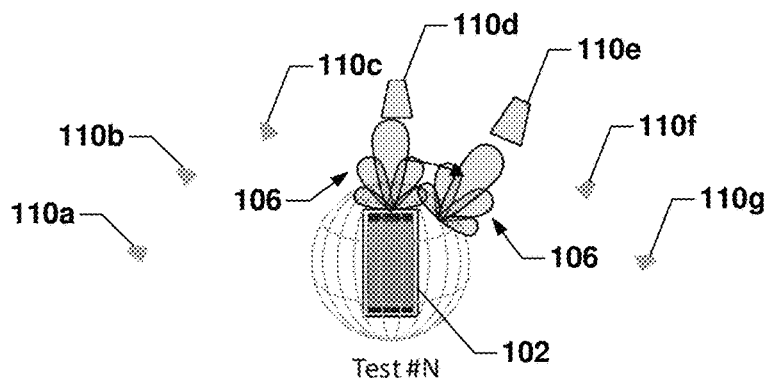

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for testing beamforming and beam management of wireless devices in an over the air test chamber. Rather than testing wireless devices in a single orientation as required by current testing standards, various embodiments involve rotating the wireless device through a serious of orientations with respect to a test antenna within the test chamber and, at each orientation, measuring communication parameters, such as data throughput and link quality, such as radio resource management (RRM) measurements and/or radio link monitor (RLM) measurements.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

Wireless devices capable of 5G communications will be configured with the ability to form radiofrequency (RF) beams to the use of multiple antennas arrayed around the devices. Beamforming is accomplished through the use of multiple radiating elements transmitting the same signal at an identical wavelength, but with a phase adjustment that reinforces RF waves in a specific direction, as if emanating from a single antenna. The more radiating elements that make up the antenna, the narrower the beam that can be generated. An artifact of beamforming is side lobes, which are unwanted radiation of the signal in directions at an angle from the desired beam direction. The more radiating elements that make up the antenna, the more focused the main beam is and the weaker the side lobes.

Personal wireless devices, such as smart phones and other user equipment, will typically be operated in a dynamic environment in which users manipulate their wireless devices, communicating while carrying them in their hands, driving in vehicles. Consequently, the direction to a given base station from a surface of a wireless device will change frequently. This will require wireless devices to frequently shift the direction of RF beams to continue to maintain communication link(s) with a given base station during a communication session. Also, redirecting of beams will be required to compensate for reflections of signals from base stations off of buildings and other structures within the environment. Thus, the ability of wireless devices to shift communication from one beam direction to another beam direction will be an essential feature for reliable 5G communications in the future.

Portable wireless devices, such as smart phones and other user equipment, have limited area and a constrained in geometry, which places practical limits on the efficiency of beamforming. Consequently, personal wireless devices will exhibit spatial directions in which beamforming is less effective or ineffective. This can pose a problem in testing of beamforming capabilities as explained herein.

The 3rd Generation Partnership Project (3GPP) Radio Access Network working group 4 (RAN4) that deals with radio performance protocol aspects has defined requirements for wireless devices operating in the frequency range 2 (FR2) that require certification testing to be conducted in an over the air chamber. The key aspects of wireless device performance to be tested are beamforming techniques that will require verification according to RAN4 specifications. Current test procedures defined by RAN4 specifications require that once a wireless device orientation and test direction has been determined before a test, those parameters stay the same during a given test, and if a test direction needs to be changed (e.g., to test beamforming and tracking), the change in test direction must be for performed on a test iteration (i.e., not during the test itself). These restrictions may allow a wireless device that is not capable of satisfactory real-time beam management to pass the test, because the test direction does not change during the test after the wireless device obtains spatial information in the initial procedure before performance measurements. This may lead to a waste of spectrum and spatial resources if wireless devices with unstable beam management behavior are able to pass RAN4 conformance tests.

FIGS. 1A-1D illustrate how beamforming performance may be tested under current over the air testing restrictions. A test chamber may include a number of antennas 110a-110g that are arrayed around the test chamber and configured to be activated individually. A wireless device 102 may be positioned within the test chamber and caused to form a beam 106 for exchanging radio frequency signals one of several antennas 110a-110g during the test sequence.

Figure 1D:
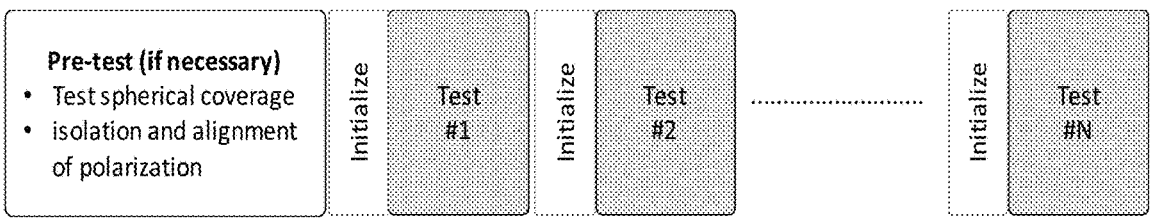

With reference to FIGS. 1A-1D, a typical test procedure may involve the following operations or steps. Before the test, a pre-test of the wireless device may be conducted to determine the spherical coverage of beamforming by the wireless device 102 in order to determine valid test orientations for testing. After the pre-test, two of the test antennas 110a-110g within the valid test orientations are activated at the beginning of an initialization operation preceding a given test. During initialization procedure, the wireless device 102 searches the Synchronization Signal Block (SSB) and starts an attachment procedure the activated test antenna (e.g., 110b). In this procedure, the wireless device trains wide and/or narrow receive beams. During the subsequent test, the relative angular offset between the directions of the two active test antennas 110a-110g is changed for each test iteration. This may be accomplished by turning down the power on a first antenna (e.g., 110b) followed by increasing the transmit power on the second antenna (e.g., 110f). This causes the wireless device to conduct beam failure detection and link recovery, testing the capability of the wireless device to perform these operations. The operations of performing the initialization procedure and conducting the test or repeated for multiple different combinations of test antennas. This sequence of tests, interrupted with initialization operations is illustrated in FIG. 1D.

Even if a wireless device passes the current conformance test requirements, due to the restriction on the current static test mechanism, there is a chance that the wireless device may encounter unstable RRM, RLM, and throughput performances in normal use when the wireless device may be arbitrarily rotated and moved around.

Various embodiments improve upon conventional test methods by providing tests that enable a wireless device to be verified in a dynamic geometry-based MIMO over the air test environment. In particular, various embodiments may include making measurements of the communication performance by a wireless device under test at each of a number of different angular orientations of the wireless device with respect to a test antenna within a test chamber, and tracking the changes in communication performance at the various orientations. Using the communication performance measurements, such as MIMO throughput and link quality measurements (e.g., RRM and/or RLM measurements), it may analyze statistically and/or by comparison to various acceptance thresholds to determine whether the wireless device satisfies beam forming performance requirements.

After an initialization procedure in which the wireless device establishes an initial antenna beam between the wireless device and the test antenna within the test chamber, a series of measurements of communication performance of the wireless device may be taken at each of a number of different angular orientations of the wireless device with respect to an antenna within a test chamber. Then without reinitializing the wireless device, a rotatable positioning system holding the wireless device, under the control of the computing device, may rotate the device to a new angular orientation with respect to the antenna in the measurements may be taken again. Because the wireless device is not reinitialized between the two angular orientations, direct comparison of the communication performance (e.g., MIMO throughput, RRM, RLM, etc.) at each of the orientations may be used as part of the test parameters. Further, detecting beam failure due to rotation of the wireless device may provide further information regarding beamforming performance. If beam failure is detected, the wireless device may reinitialize and the test may be continued, otherwise measurements of communication performance may be made almost continuously until measurements have been obtained at all valid test orientations. Appropriate, or valid, test orientations may be determined as part of pretesting when the spherical beamforming capability of the wireless device is determined (sometimes referred to as determining Effective Isotropic Sensitivity (EIS) spherical coverage), as conducting testing at orientations at which the wireless device is incapable or less capable of forming a beam could lead to misleading or useless results. In some embodiments, the computing device may be configured to limit the wireless device orientations at which measurements are taken to only valid test orientations as determined during the pre-testing. In some embodiments, communication performance measurements that are taken at invalid test orientations may be ignored or otherwise not considered when determining the overall performance of the wireless device.

In some embodiments, the series of measurements of communication performance may include a series of measurements of MIMO throughput. Examples of performance pass/fail criteria that may be applied to such MIMO throughput measurements may include one or more of comparing a standard deviation of the measurements of MIMO throughput to a pass/fail threshold, comparing a minimum of the measurements of MIMO throughput to a pass/fail threshold, comparing a mean of the measurements of MIMO throughput to a pass/fail threshold, determining a cumulative density function from the measurements of MIMO throughput and determining whether the wireless device can statistically achieve a MIMO throughput better than a threshold percentage of the maximum throughput, determining whether a number of communication link/beam failure events that occurred between rotations of the wireless device exceeds a threshold, or determining a distribution of a difference between MIMO throughput before and after rotations of the wireless device to a new angular orientation with respect to the antenna within the test chamber.

In some embodiments, the series of measurements of communication performance may include a series of measurements of link quality. Examples of performance pass/fail criteria that may be applied to measurements of link quality (e.g., RRM, RLM, etc.) may include one or more of comparing an absolute accuracy for link quality measurements to a pass/fail threshold, comparing a standard deviation of the measurements of link quality to a pass/fail threshold, comparing a minimum of the measurements of link quality to a pass/fail threshold, comparing a mean of the measurements of link quality to a pass/fail threshold, determining a cumulative density function from the measurements of link quality and determining whether the wireless device can statistically achieve a link quality better than a threshold percentage of the maximum link quality, determining whether a number of communication link/beam failure events that occurred between rotations of the wireless device exceeds a threshold, or determining a distribution of a difference between link quality measured before and after rotations of the wireless device to a new angular orientation with respect to the antenna within the test chamber.

Further embodiments include a test chamber, an antenna within the test chamber, a rotatable positioning system within the test chamber configured to hold a wireless device and rotate the wireless device within a range of orientations with respect to the antenna, and a computing device coupled to the antenna and the rotatable positioning system, and configured with processor executable instructions to perform operations of any of the embodiment methods described herein.

Figure 2:
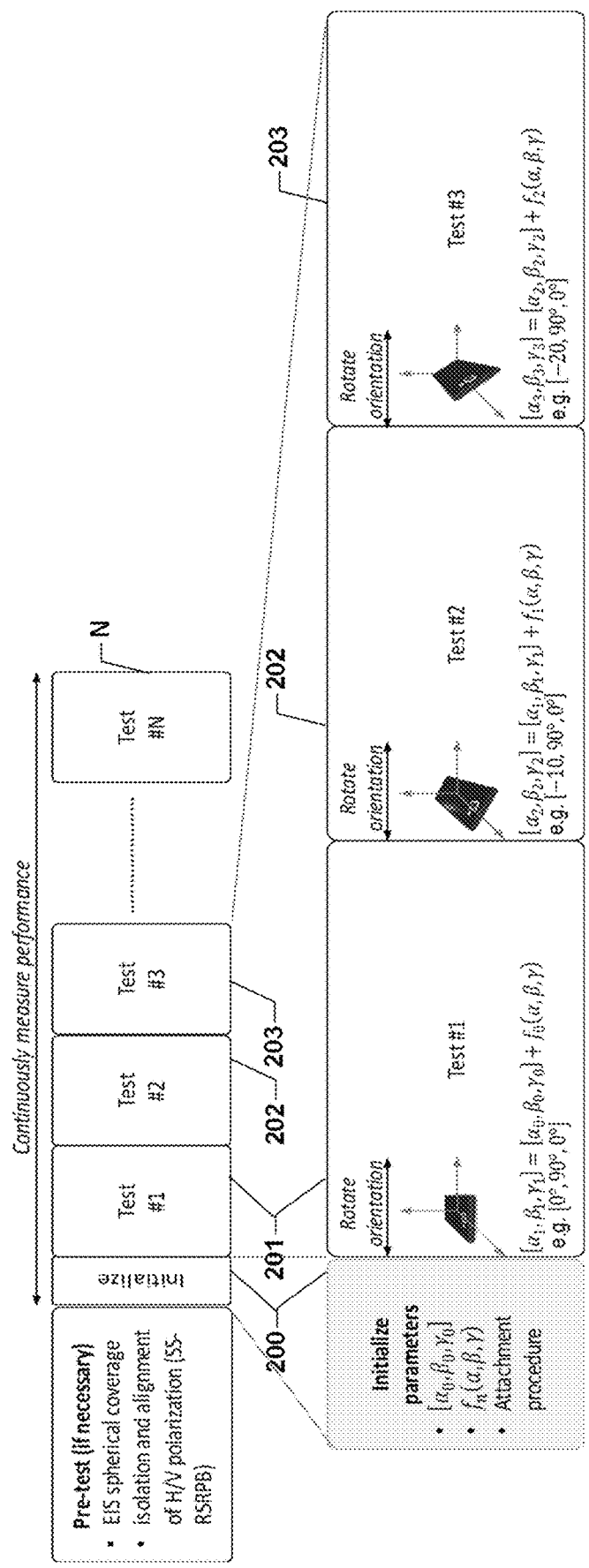
FIG. 2 illustrates a method of testing of beamforming capabilities of a wireless device by periodically reorienting the wireless device within a test chamber according to various embodiments.

FIG. 2 illustrates beamforming performance testing according to various embodiments. In various embodiments, the wireless device is held in a rotatable positioning system within the test chamber and rotated to a new orientation for each test series of performance measurement. Each test 201, 202, 203, N at each orientation involves a plurality of performance measurements, such as MIMO throughput measurements or signal quality measurements (e.g., RRM, RLM, etc.). As illustrated in FIG. 2, there is no need to reperform the initialization procedure 200, which enables the testing procedure to also address the beamforming ability of the wireless device to shift the as the wireless device is rotated with respect to the test antenna.

Figure 3:
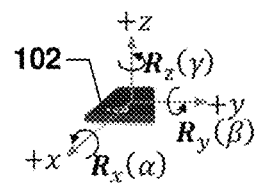
FIG. 3 is a diagram illustrating rotational coordinates for a wireless device.

FIG. 3 illustrates for reference three axes of rotation about which the rotatable positioning system may reorient or rotate the wireless device for each test as illustrated in FIG. 2.

Figure 4A:
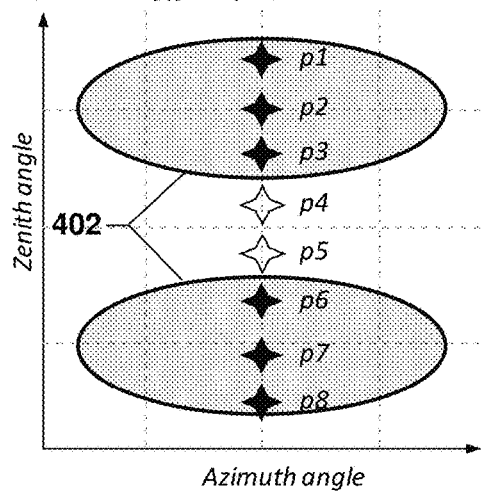
FIGS. 4A and 4B are graphs illustrating angular regions in which valid testing of beamforming and associated communication capabilities of a wireless device may be accomplished according to various embodiments.
Figure 4B:
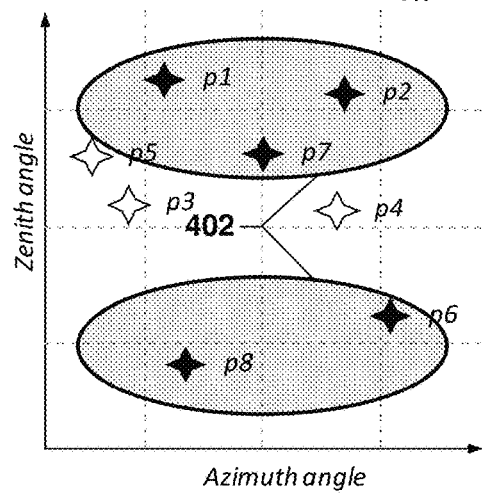

FIGS. 4A and 4B are graphs showing orientation domains 402 defined by azimuth angle and zenith angle in which valid testing can be performed. Valid testing orientation domains 402 are angular orientations of the wireless device with respect to the test antenna for which the device can be expected to generate satisfactory beams, as determined during initial testing. The valid test orientation domains 402 may be determined during the pre-testing of the wireless device in which angular orientations of acceptable beamforming can be determined. Outside the valid testing orientation domains 402, the wireless device may not be capable of generating beams that will provide reliable performance, which can lead to misleading or unusable results and therefore maybe excluded from testing.

FIG. 4A illustrates one testing process in which the wireless device is incrementally rotated about the zenith axis, for example, such that the azimuth angle does not change. At each of a different zenith angle testing points p1-p8, a series of communication performance measurements (e.g., MIMO throughput, RRM, RLM, etc.) may be taken before rotation to the next test point. When a rotation puts the wireless device in an orientation outside the valid testing orientation domains 402, such as at points p4 and p5, the test measurements may be ignored or deleted, or measurements may not be taken and the wireless device may be rotated to the next incremental test orientation.

FIG. 4B illustrates another testing process in which the wireless device is randomly oriented about the zenith axis and the azimuth angle. Randomly reorienting the wireless device with respect to the antenna is illustrated FIG. 4B may be more representative of how wireless devices are used in real life. Unless the computing device controlling the rotatable positioning system excludes in valid test orientations, such testing may occasionally place the wireless device outside of a valid test orientation domain 402, such as illustrated with points p3, p4, and p5. When a rotation puts the wireless device in an orientation outside the valid testing orientation domains 402, the test measurements may be ignored or deleted, or measurements may not be taken and the wireless device may be rotated to the next randomly selected test orientation.

FIG. 5 illustrates graphically examples of MIMO throughput measurements taken at each of a number of orientations $T_1$, $T_2$, $T_3$ and $T_N$. As illustrated, multiple performance measurements may be taken at each orientation and the data processed for the purpose of determining whether the test is passed or failed. For example, the MIMO throughput measurements in test orientation $T_3$ fall significantly below the measurements in other orientations and therefore may be discarded or ignored.

FIG. 6 similarly illustrates graphically examples of link quality measurements (e.g., RRM and/or RLM measurements) taken at each of a number of orientations $T_1$, $T_2$, $T_3$ and $T_N$. As illustrated, multiple performance measurements may be taken at each orientation and the data processed for the purpose of determining whether the test is passed or failed. For example, the link quality measurements (e.g., RRM and/or RLM measurements) in test orientation $T_3$ fall significantly below the measurements in other orientations and therefore may be discarded or ignored.

Figure 7:
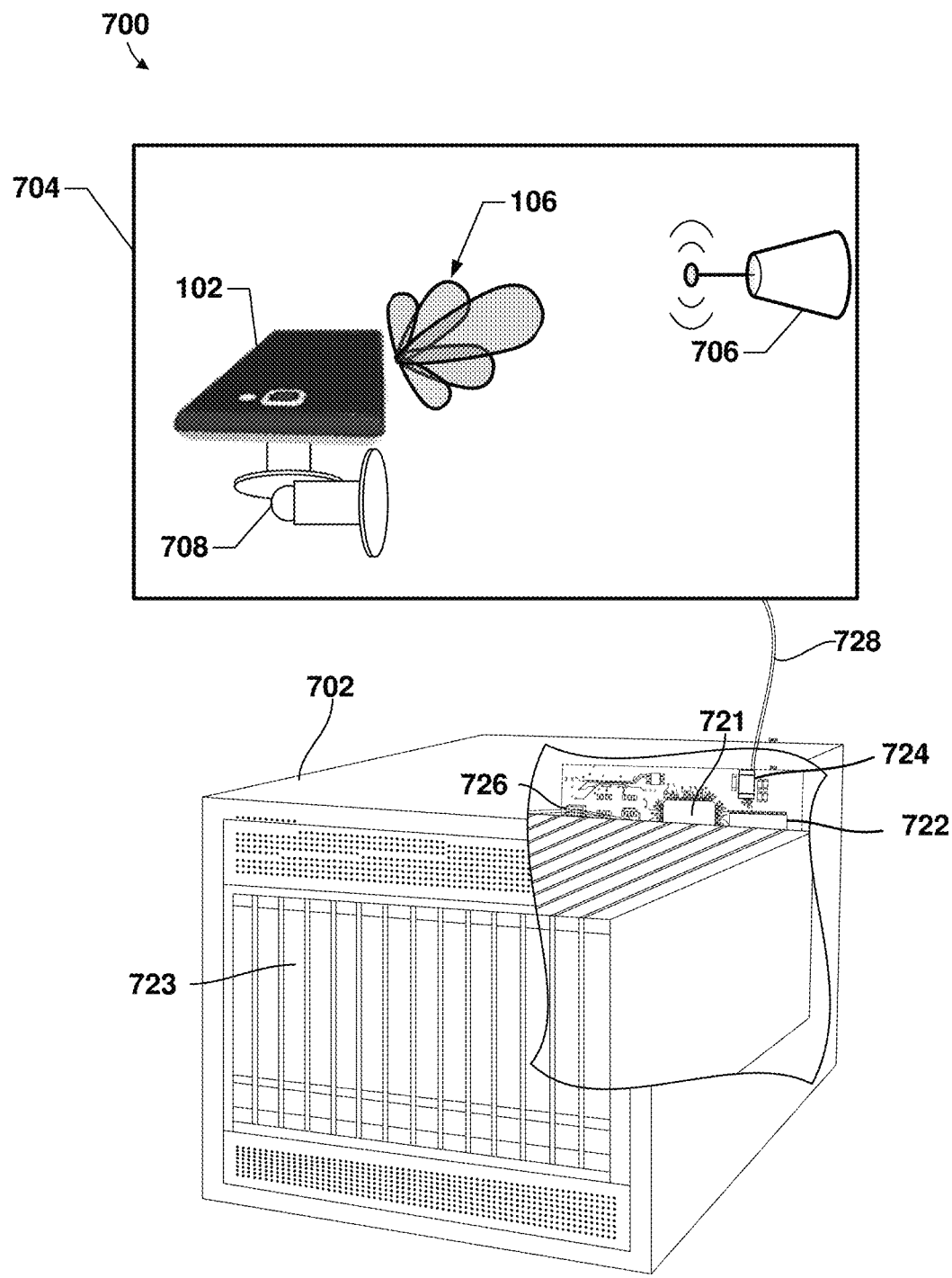
FIG. 7 is a system diagram components of a wireless device testing apparatus suitable for use with various embodiments.

FIG. 7 illustrates a wireless device test apparatus suitable for implementing various embodiments. A wireless device test apparatus 700 may include a computing device 702 communicatively coupled to a test chamber 704 that includes a test antenna 706 and a rotatable positioning system 708 configured to hold and orient a wireless device 102 with respect to the test antenna. The computing device 702 may be coupled to the test chamber 704 (e.g., via a data and/or control cable 728) so as to send control signals to and receive signals (e.g., MIMO throughput and link quality measurements (e.g., RRM and/or RLM measurements)) from the test antenna 706, send control signals to the rotatable positioning system 708, and send control signals to and receive data from a wireless device 102. The test chamber 704 may be configured to shield the wireless device 102 and the test antenna 706 from RF signals outside the chamber, and minimize reflections of RF signals within the chamber. The test antenna 706 may be configured to transmit wireless signals, such as signals representative of signals normally broadcast by base stations, at varying power levels as controlled by the computing device 702. The rotatable positioning system 708 may be configured to receive orientation commands from the computing device 702 and respond to such commands by rotating the wireless device into designated angular orientations with respect to the test antenna 706.

The computing device 702 may include a processor 721 coupled to volatile memory 722 and a large capacity non-volatile memory, such as a disk drive 723. The computing device 702 may also include a peripheral memory access device such as a floppy disc drive, compact disc (CD) or digital video disc (DVD) drive 726 coupled to the processor 721. The computing device 702 may also include control and data access ports 724 (or interfaces) coupled to the processor 721 for establishing data and/or control connections (e.g., 728) to the test chamber 704, test antenna 706, and rotatable positioning system 708, and a wireless device 102 undergoing test. The network computing device 702 may be connected to one or more antennas for sending and receiving electromagnetic radiation that may be connected to a wireless communication link. The network computing device 702 may include additional access ports, such as USB, Firewire, Thunderbolt, and the like for coupling to peripherals, external memory, or other devices.

Figure 8A:
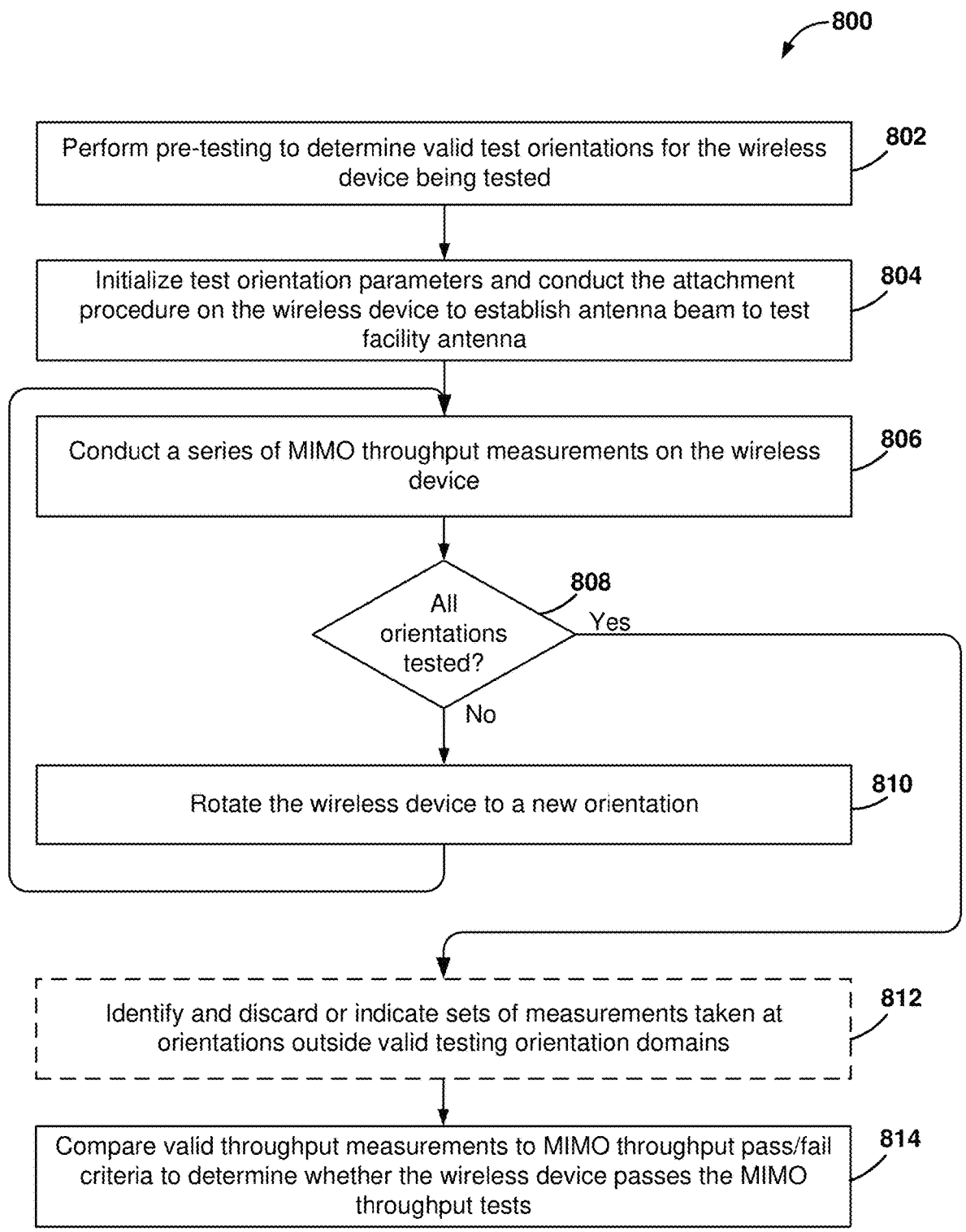
FIGS. 8A and 8B are process flow diagrams illustrating methods of testing beamforming capabilities of the wireless device by measuring MIMO throughput at various wireless device orientations in accordance with various embodiments.

FIG. 8A is a process flow diagram on an embodiment method 800 for conducting MIMO throughput testing of a wireless device according to one embodiment. The operations of the method 800 may be performed by a computing device (e.g., 702) configured with processor-executable instructions to implement the method, control a rotatable positioning system (e.g., 708), and receive signals from a test antenna (e.g., 706) within a test chamber (e.g., 704).

In block 802, the computing device may perform pretesting to determine valid test orientations for the wireless device being tested. As described, wireless devices typically have orientations in which their antennas are not able to effectively generate a satisfactory RF beam. Pretesting in block 802 enables the computing device to identify orientations in which valid test measurements may be obtained and orientations in which valid test measurements not be achievable. In some embodiments, the computing device may use this information to determine a rotation generation function that will ensure that all test orientations of the wireless device stay within valid test orientations, while enabling testing procedures that involve randomly reorienting the wireless device between each series of communication performance measurements.

In block 804, the computing device may initialize test orientation parameters (e.g., positioning and orienting the wireless device for the first test) and cause the wireless device to locate the test antenna by monitoring the SSB and conduct an attachment procedure in which the wireless device establishes an initial beam toward the test antenna.

In block 806, the computing device may cause the wireless device and test antenna to make a series of measurements of MIMO throughput. The same measurement may be performed a number of times to obtain statistically significant results and minimize the effect of random measurement deviations and errors.

In determination block 808, the computing device may determine whether the wireless device has been tested over all test orientations. The total number of test orientations or the orientations to be tested may be determined in advance, such as during the pretesting operations in block 802, or as determined by a technician.

In response to determining that not all wireless device orientations have been tested (i.e., determination block 808="no"), the computing device may rotate the wireless device to a new orientation in block 810. In some embodiments, the computing device may control the rotatable positioning system to cause the wireless device to rotate through a preset incremental angle as illustrated in FIG. 4A. In some embodiments, the computing device may determine a randomly selected orientation and direct the rotatable positioning system to move the wireless device into the selected orientation as illustrated in FIG. 4B. The computing device may then cause the wireless device and test antenna to make another series of measurements of MIMO throughput in block 806 as described.

In response to determining that all wireless device orientations have been tested (i.e., determination block 808="yes"), the computing device may optionally identify and discard or indicate sets of measurements taken at orientations that were outside of valid testing orientation domains in block 812. By discarding or indicating sets of measurements that were taken at orientations outside valid testing orientation domains, the computing device cannot avoid considering or applying such measurements when determining whether the wireless device passes or fails acceptable performance criteria. The operations in block 812 may be optional because in some embodiments the computing device may be configured to control the rotatable positioning system so that the wireless devices only positioned in valid test orientations, and therefore there may be no measurements taken in orientations outside valid testing orientation domains. Also, the computing device may be configured to control the wireless device and test antenna so that no measurements are taken when the wireless device is rotated into an orientation outside valid testing orientation domains.

In block 814, the computing device may then compare valid throughput measurements (i.e., measurements obtained when the wireless device was within a valid testing orientation domain) to MIMO throughput pass/fail criteria to determine whether the wireless device passes the MIMO throughput tests. A variety of MIMO throughput pass/fail criteria may be used in various embodiments. Some examples of MIMO throughput pass/fail criteria include one or more of comparing a standard deviation of the measurements of MIMO throughput to a pass/fail threshold, comparing a minimum of the measurements of MIMO throughput to a pass/fail threshold, comparing a mean of the measurements of MIMO throughput to a pass/fail threshold, determining a cumulative density function from the measurements of MIMO throughput and determining whether the wireless device can statistically achieve a MIMO throughput better than a threshold percentage of the maximum throughput, determining whether a number of communication link/beam failure events that occurred between rotations of the wireless device exceeds a threshold, or determining a distribution of a difference between MIMO throughput before and after rotations of the wireless device to a new angular orientation with respect to the antenna within the test chamber.

Figure 8B:
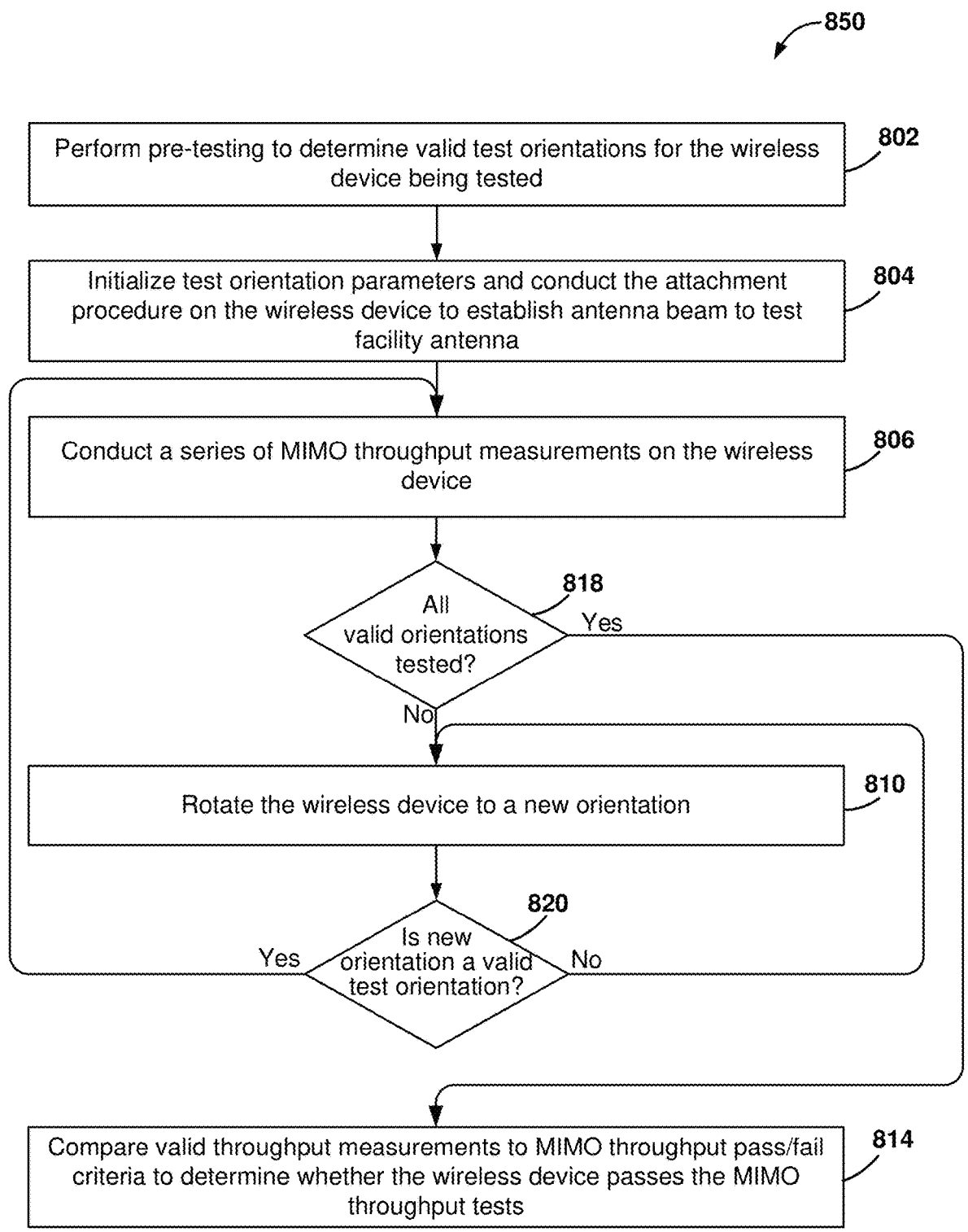

FIG. 8B is a process flow diagram on an embodiment method 850 for conducting MIMO throughput testing of a wireless device according to another embodiment. The operations of the method 850 may be performed by a computing device (e.g., 702) configured with processor-executable instructions to implement the method, control a rotatable positioning system (e.g., 708), and receive signals from a test antenna (e.g., 706) within a test chamber (e.g., 704). In the method 850, the computing device may perform the operations in blocks 802, 804, 806, 810 and 814 as described.

Following each rotation of the wireless device to a new orientation in block 810, the computing device may determine whether the new orientation is a valid test orientation in determination block 820. As described, this may involve comparing the new orientation to orientations in which the wireless device is able to generate a satisfactory beam as determined in pretesting performed in a block 802.

In response to determining that the new orientation is not a valid test orientation (i.e., determination block 820="no"), the computing device may control the rotatable positioning system to rotate the wireless device to a new orientation in block 810. After this rotation, the computing device may again determine whether the new orientation is a valid test orientation by re-performing the operations in determination block 820 until the wireless device is in a valid test orientation.

In response to determining that the new orientation is a valid test orientation (i.e., determination block 820="yes"), the computing device may control the wireless device and the test antenna to conduct a series of MIMO throughput measurements on the wireless device in block 806 as described. Following each series of MIMO throughput measurements on the wireless device in block 806, the computing device determine whether all valid orientations have been tested in determination block 818. If all valid orientations of been tested (i.e., determination block 818="yes"), the computing device may compare the valid throughput measurements to MIMO throughput pass/fail criteria to determine whether the wireless device passes the MIMO throughput tests in block 814 as described. Otherwise (i.e., determination block 818="no"), the computing device may control the rotatable positioning system to rotate the wireless device to a new orientation in block 810 and proceed with the operations in blocks 806 through 820 as described.

Figure 9A:
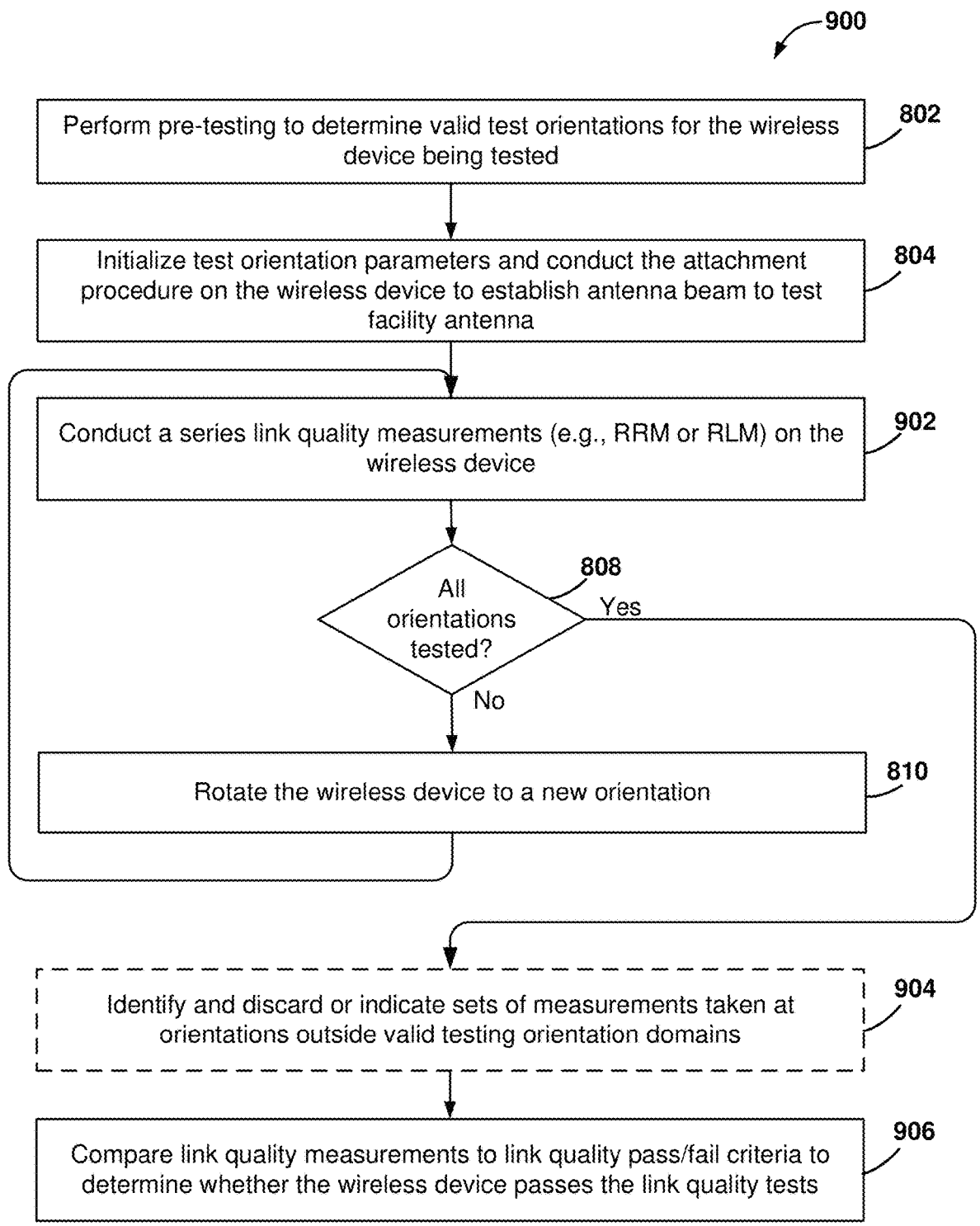
FIGS. 9A and 9B are process flow diagrams illustrating a method of testing beamforming capabilities of the wireless device by measuring link quality characteristics at various wireless device orientations in accordance with various embodiments.

FIG. 9A is a process flow diagram on an embodiment method for conducting link quality testing of a wireless device according to one embodiment. The operations of the method 900 may be performed by a computing device (e.g., 702) configured with processor-executable instructions to implement the method, control a rotatable positioning system (e.g., 708), and receive signals from a test antenna (e.g., 706) within a test chamber (e.g., 704). In the method 900, the computing device may perform the operations in blocks 802, 804, 808, 810, 812 and 814 of the method 800 as described.

In block 902, the computing device may control the wireless device and test antenna to conduct a series of link quality measurements on the wireless device. For example, the computing device may cause the wireless device and test antenna to conduct RRM measurements and/or RLM measurements.

Once all orientations have been tested (i.e., determination block 808="yes") the computing device may identify and discard or identify sets of measurements taken at orientations outside valid testing orientation domains in optional block 904. The operations in optional block 904 may be similar to those in optional block 812 of the method 800 as described, although the criteria for discarding some sets of link quality measurements may differ from some criteria for discarding some sets of MIMO throughput measurements applied in block 812. As with block 812, the operations in block 904 may be optional because in some embodiments the computing device may be configured to control the rotatable positioning system so that the wireless devices only positioned in valid test orientations, and therefore there may be no measurements taken in orientations outside valid testing orientation domains. Also, the computing device may be configured to control the wireless device and test antenna so that no link quality measurements are taken when the wireless device is rotated into an orientation outside valid testing orientation domains.

The computing device may compare the link quality measurements to link quality pass/fail criteria to determine whether the wireless device passes the link quality test in block 906. A variety of link quality pass/fail criteria may be used in various embodiments. Some examples of link quality pass/fail criteria include one or more of comparing an absolute accuracy for link quality measurements to a pass/fail threshold, comparing a standard deviation of the measurements of link quality to a pass/fail threshold, comparing a minimum of the measurements of link quality to a pass/fail threshold, comparing a mean of the measurements of link quality to a pass/fail threshold, determining a cumulative density function from the measurements of link quality and determining whether the wireless device can statistically achieve a link quality better than a threshold percentage of the maximum link quality, determining whether a number of communication link/beam failure events that occurred between rotations of the wireless device exceeds a threshold, or determining a distribution of a difference between link quality measured before and after rotations of the wireless device to a new angular orientation with respect to the antenna within the test chamber.

Figure 9B:
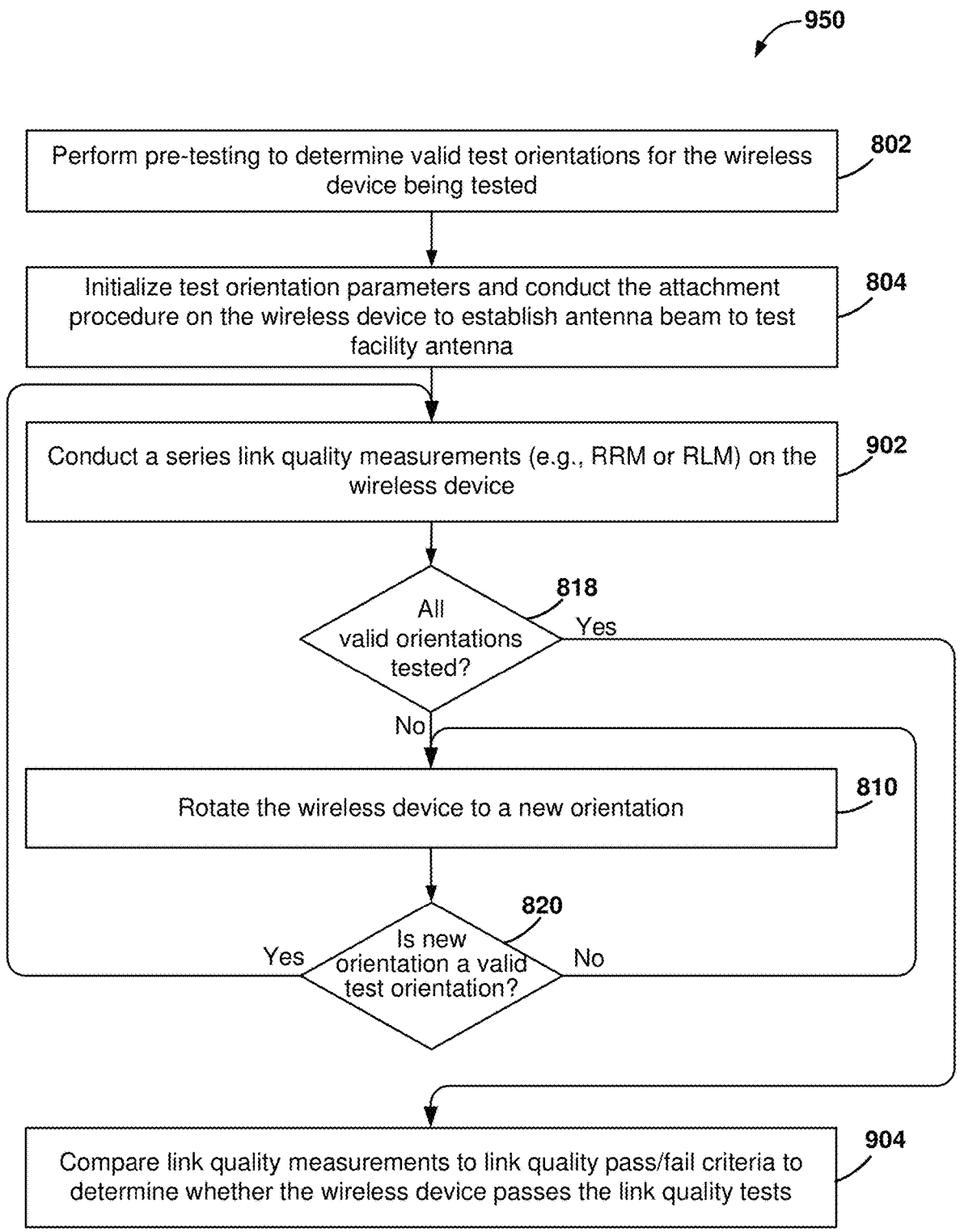

FIG. 9B is a process flow diagram on an embodiment method 950 for conducting link quality testing of a wireless device according to one embodiment. The operations of the method 950 may be performed by a computing device (e.g., 702) configured with processor-executable instructions to implement the method, control a rotatable positioning system (e.g., 708), receive signals from a test antenna (e.g., 706) within a test chamber (e.g., 704).

In the method 950, the computing device may perform the operations in blocks 802, 804, 810 and 814 of the method 800 as described, the operations of blocks 818 and 820 of the method 850 as described and the operations in blocks 902 and 904 of the method 900 as described. Thus, following each rotation of the wireless device to a new orientation in block 810, the computing device may determine whether the new orientation is a valid test orientation in determination block 820. In response to determining that the new orientation is not a valid test orientation (i.e., determination block 820="no"), the computing device may control the rotatable positioning system to rotate the wireless device to a new orientation in block 810 and again determine whether the new orientation is a valid test orientation by re-performing the operations in determination block 820 until the wireless device is in a valid test orientation.

In response to determining that the new orientation is a valid test orientation (i.e., determination block 820="yes"), the computing device may control the wireless device and the test antenna to conduct a series of link quality measurements on the wireless device in block 902 as described. Following each series of link quality measurements on the wireless device in block 902, the computing device determine whether all valid orientations have been tested in determination block 818. If all valid orientations of been tested (i.e., determination block 818="yes"), the computing device may compare the valid link quality measurements to link quality pass/fail criteria to determine whether the wireless device passes the link quality tests in block 904 as described. Otherwise (i.e., determination block 818="no"), the computing device may control the rotatable positioning system to rotate the wireless device to a new orientation in block 810 and proceed with the operations in the method 950 as described.

Figure 10:
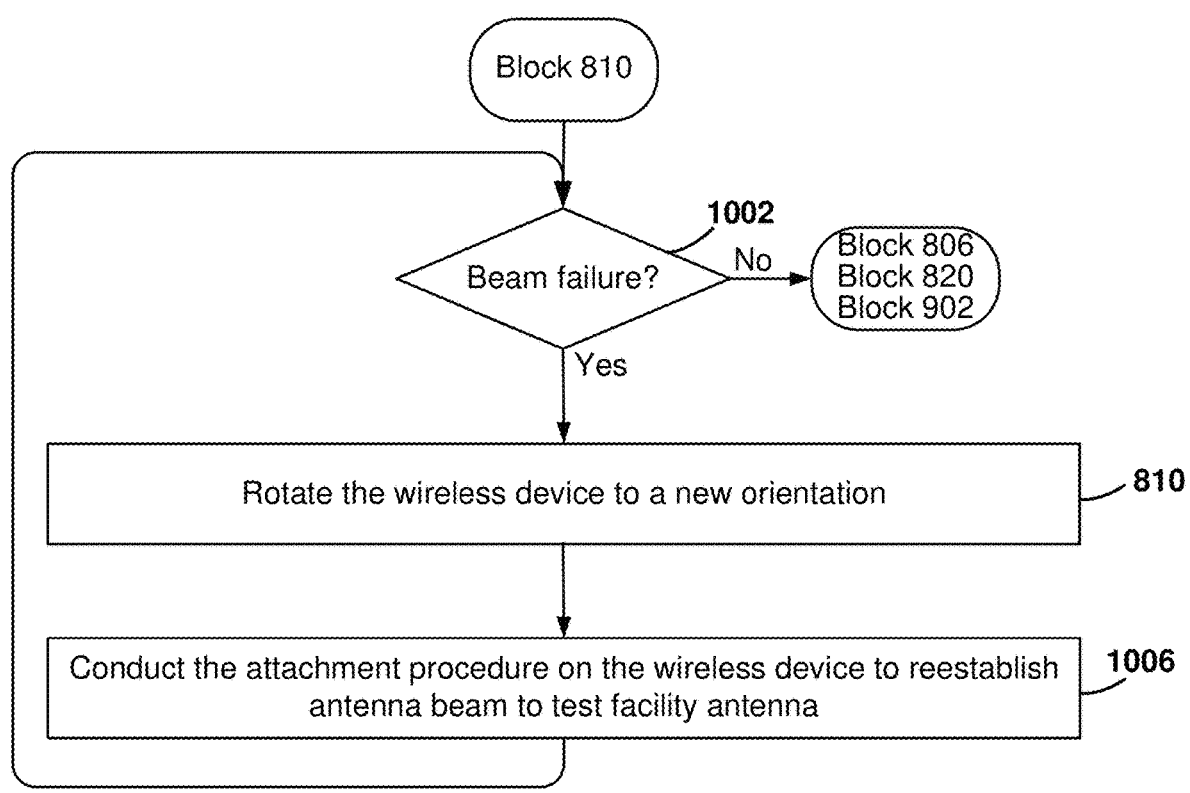
FIG. 10 is a process flow diagram illustrating some operations that may be performed while testing beamforming capabilities of the wireless device in accordance with various embodiments.

FIG. 10 is a process flow diagram illustrating operations that may be performed in any of the methods 800, 850, 900 or 950 when the wireless device is moved to an orientation that leads to a beam failure. The operations illustrated in FIG. 10 may be performed by a computing device (e.g., 702) configured with processor-executable instructions to implement the method, control a rotatable positioning system (e.g., 708), and receive signals from a test antenna (e.g., 706) within a test chamber (e.g., 704).

Following rotation of the wireless device to a new orientation in block 810, the wireless device may determine whether a beam failure has occurred in block 1002. As is well known, link failure may occur when a link quality through an established beam falls below a minimum quality.

If a beam failure has not occurred following rotation of the wireless device (i.e., determination block 1002="no"), the computing device may perform the operations in block 806 of the method 800, determination block 820 of the methods 850 or 950, or block 902 of method 900 as described.

In response to determining that beam failure has occurred (i.e., determination block 1002="yes"), the computing device may rotate the wireless device to a new orientation in block 810 as described. Once in the new orientation, the wireless device may conduct the attachment procedure to reestablish an antenna beam to the test facility in block 1006. Again, following this rotation to a new orientation, the wireless device may again determine whether beam failure or failure to establish a beam has occurred in block 1002.

To summarize the embodiment methods 800, 850, 900, 950 illustrated in FIGS. 8A through 9B, the computing device of a test facility may perform testing of a wireless device for beam forming performance by determining measurements of communication performance of the wireless device at each of a number of different angular orientations of the wireless device with respect to an antenna within a test chamber, and determining whether the wireless device satisfies beam forming performance requirements by comparing the measurements of communication performance to pass/fail criteria. Such operations may involve conducting a series of measurements of communication performance of the wireless device at a given angular orientation of the wireless device with respect to the antenna within the test chamber, rotating the wireless device to a new angular orientation with respect to the antenna within the test chamber, and repeating the operations of conducting the series of measurements of communication performance and rotating the wireless device to a new angular orientation until measurements of communication performance have been conducted at all angular orientations at which wireless device testing is planned.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 800, 850, 900 and 950 may be substituted for or combined with one or more operations of the methods 800, 850, 900 and 950.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, DISCRETE hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of testing a wireless device for beam forming performance, comprising:
    performing pretesting of the wireless device to determine a set of valid test orientations, wherein a corresponding valid test orientation of the set of valid test orientations is based at least in part on a testing performance reliability associated with a corresponding beam generated by the wireless device during the pretesting;
    determining measurements of communication performance of the wireless device at one or more angular orientations of the wireless device with respect to an antenna within a test chamber, wherein each angular orientation of the one or more angular orientations corresponds to a valid test orientation of the set of valid test orientations; and
    determining whether the wireless device satisfies beam forming performance requirements by comparing the measurements of communication performance to one or more threshold criteria.

2. The method of claim 1, wherein determining measurements of communication performance of the wireless device at one or more angular orientations of the wireless device with respect to an antenna within a test chamber comprises:
    conducting a series of measurements of communication performance of the wireless device at a given angular orientation of the wireless device with respect to the antenna within the test chamber;
    rotating the wireless device to a new angular orientation with respect to the antenna within the test chamber; and
    repeating operations of conducting the series of measurements of communication performance and rotating the wireless device to the new angular orientation for the one or more angular orientations.

3. The method of claim 2, wherein:
    the series of measurements of communication performance comprise a series of measurements of multiple input multiple output (MIMO) throughput; and
    comparing the measurements of communication performance to one or more threshold criteria comprises one or more of:
        comparing a standard deviation of the measurements of MIMO throughput to a pass/fail threshold;
        comparing a minimum of the measurements of MIMO throughput to a pass/fail threshold;
        comparing a mean of the measurements of MIMO throughput to a pass/fail threshold;
        determining a cumulative density function from the measurements of MIMO throughput and determining whether the wireless device can statistically achieve a MIMO throughput better than a threshold percentage of a maximum throughput;
        determining whether a number of communication link/beam failure events that occurred between rotations of the wireless device exceeds a threshold number; or
        determining a distribution of a difference between MIMO throughput before and after rotations of the wireless device to a new angular orientation with respect to the antenna within the test chamber.

4. The method of claim 2, wherein:
    the series of measurements of communication performance comprise a series of measurements of link quality; and comparing the measurements of communication performance to one or more threshold criteria comprises one or more of:
    comparing an absolute accuracy for link quality measurements to a pass/fail threshold;
    comparing a standard deviation of the measurements of link quality to a pass/fail threshold;
    comparing a minimum of the measurements of link quality to a pass/fail threshold;
    comparing a mean of the measurements of link quality to a pass/fail threshold;
    determining a cumulative density function from the measurements of link quality and determining whether the wireless device can statistically achieve link quality better than a threshold percentage of a maximum link quality;
    determining whether a number of communication link/beam failure events that occurred between rotations of the wireless device exceeds a threshold number; or
    determining a distribution of a difference between link quality measured before and after rotations of the wireless device to a new angular orientation with respect to the antenna within the test chamber.

5. The method of claim 1, further comprising:
    conducting an attachment procedure on the wireless device to establish an initial antenna beam between the wireless device and the antenna within the test chamber, wherein the attachment procedure is conducted with the wireless device at a first angular orientation of the one or more angular orientations, wherein the first angular orientation comprises a first angle associated with a first axis of the wireless device, and wherein determining the measurements of communication performance of the wireless device at each angular orientation of the one or more angular orientations of the wireless device with respect to the antenna within the test chamber comprises:
    conducting a series of measurements of communication performance of the wireless device at a second angular orientation of the one or more angular orientations, wherein the second angular orientation comprises a second angle associated with the first axis that is different from the first angle, and wherein the conducting the series of measurements of communication performance of the wireless device at the second angular orientation is based at least in part one or more initialization operation parameters determined from the attachment procedure conducted with the wireless device at the first angular orientation.

6. The method of claim 5, wherein the first axis comprises a zenith axis.

7. The method of claim 1, further comprising:
    rotating the wireless device to a new angular orientation with respect to the antenna within the test chamber without measuring communication performance in response to determining that an angular orientation of the wireless device with respect to the antenna within the test chamber is not a valid test orientation of the set of valid test orientations.

8. The method of claim 1, further comprising:
    determining that a series of measurements of communication performance of the wireless device was obtained with the wireless device in an invalid test orientation with respect to the antenna; and
    not considering the series of measurements of communication performance of the wireless device taken in the invalid test orientation.

9. A wireless device testing apparatus for testing wireless device beam forming performance, comprising:
    a test chamber;
    an antenna within the test chamber;
    a rotatable positioning system within the test chamber configured to hold a wireless device and rotate the wireless device within a range of orientations with respect to the antenna; and
    a computing device that includes one or more processors and one or more memories coupled with the one or more processors, the computing device coupled to the antenna and the rotatable positioning system, and the computing device configured to cause the wireless device testing apparatus to:
    perform pretesting of the wireless device to determine a set of valid test orientations, wherein a corresponding valid test orientation of the set of valid test orientations is based at least in part on a testing performance reliability associated with a corresponding beam generated by the wireless device during the pretesting;
    determine measurements of communication performance by the wireless device at one or more angular orientations of the wireless device with respect to the antenna, wherein each angular orientation of the one or more angular orientations corresponds to a valid test orientation of the set of valid test orientations; and
    determine whether the wireless device satisfies beam forming performance requirements by comparing the measurements of communication performance to one or more threshold criteria.

10. The wireless device testing apparatus of claim 9, wherein, to determine measurements of communication performance of the wireless device at one or more angular orientations of the wireless device with respect to an antenna within a test chamber, the computing device is configured to cause the wireless device testing apparatus to:
    conduct a series of measurements of communication performance of the wireless device at a given angular orientation of the wireless device with respect to the antenna within the test chamber;
    rotate the wireless device to a new angular orientation with respect to the antenna within the test chamber; and
    repeat operations of conducting the series of measurements of communication performance and rotating the wireless device to the new angular orientation for the one or more angular orientations.

11. The wireless device testing apparatus of claim 10, wherein the series of measurements of communication performance comprise a series of measurements of multiple input multiple output (MIMO) throughput; and
    wherein, to compare the measurements of communication performance to one or more threshold criteria, the computing device is configured to cause the wireless device testing apparatus to one or more of:
        compare a standard deviation of the measurements of MIMO throughput to a pass/fail threshold;
        compare a minimum of the measurements of MIMO throughput to a pass/fail threshold;
        compare a mean of the measurements of MIMO throughput to a pass/fail threshold;
        determine a cumulative density function from the measurements of MIMO throughput and determining whether the wireless device can statistically achieve a MIMO throughput better than a threshold percentage of a maximum throughput;
determine whether a number of communication link/beam failure events that occurred between rotations of the wireless device exceeds a threshold number; or
determine a distribution of a difference between MIMO throughput before and after rotations of the wireless device to a new angular orientation with respect to the antenna within the test chamber.

12. The wireless device testing apparatus of claim 10, wherein the series of measurements of communication performance comprise a series of measurements of link quality; and
wherein, to compare the measurements of communication performance to one or more threshold criteria, the computing device is configured to cause the wireless device testing apparatus to one or more of:
compare an absolute accuracy for link quality measurements to a pass/fail threshold;
compare a standard deviation of the measurements of link quality to a pass/fail threshold;
compare a minimum of the measurements of link quality to a pass/fail threshold;
compare a mean of the measurements of link quality to a pass/fail threshold;
determine a cumulative density function from the measurements of link quality and determining whether the wireless device can statistically achieve link quality better than a threshold percentage of a maximum link quality;
determine whether a number of communication link/beam failure events that occurred between rotations of the wireless device exceeds a threshold number; or
determine a distribution of a difference between link quality measured before and after rotations of the wireless device to a new angular orientation with respect to the antenna within the test chamber.

13. The wireless device testing apparatus of claim 9, wherein the computing device is configured to:
conduct an attachment procedure on the wireless device to establish an initial antenna beam between the wireless device and the antenna within the test chamber, wherein the attachment procedure is conducted with the wireless device at a first angular orientation of the one or more angular orientations, wherein the first angular orientation comprises a first angle associated with a first axis of the wireless device, and wherein to cause the wireless testing device apparatus to determine the measurements of communication performance of the wireless device at each angular orientation of the one or more angular orientations of the wireless device with respect to the antenna within the test chamber, the computing device is configured to cause the wireless testing device apparatus to:
conduct a series of measurements of communication performance of the wireless device at a second angular orientation of the one or more angular orientations, wherein the second angular orientation comprises a second angle associated with the first axis that is different from the first angle, and wherein the conducting the series of measurements of communication performance of the wireless device at the second angular orientation is based at least in part one or more initialization operation parameters determined from the attachment procedure conducted with the wireless device at the first angular orientation.

14. The wireless device testing apparatus of claim 13, wherein the first axis comprises a zenith axis.

15. The wireless device testing apparatus of claim 9, wherein the computing device is configured to cause the wireless device testing apparatus to
rotate the wireless device to a new angular orientation with respect to the antenna within the test chamber without measuring communication performance in response to a determination that an angular orientation of the wireless device with respect to the antenna within the test chamber is not a valid test orientation of the set of valid test orientations.

16. The wireless device testing apparatus of claim 9, wherein the computing device is configured to cause the wireless device testing apparatus to:
compare that a series of measurements of communication performance of the wireless device was obtained with the wireless device in an invalid test orientation with respect to the antenna; and
not consider the series of measurements of communication performance of the wireless device taken in the invalid test orientation.

17. A wireless device testing apparatus, comprising:
means for performing pretesting of a wireless device to determine a set of valid test orientations, wherein a corresponding valid test orientation of the set of valid test orientations is based at least in part on a testing performance reliability associated with a corresponding beam generated by the wireless device during the pretesting;
means for determining measurements of communication performance of a wireless device at one or more angular orientations of the wireless device with respect to an antenna within a test chamber, wherein each angular orientation of the one or more angular orientations corresponds to a valid test orientation of the set of valid test orientations; and
means for determining whether the wireless device satisfies beam forming performance requirements by comparing the measurements of communication performance to one or more threshold criteria.

18. The wireless device testing apparatus of claim 17, wherein means for determining measurements of communication performance of the wireless device at one or more angular orientations of the wireless device with respect to an antenna within a test chamber comprises:
means for conducting a series of measurements of communication performance of the wireless device at a given angular orientation of the wireless device with respect to the antenna within the test chamber;
means for rotating the wireless device to a new angular orientation with respect to the antenna within the test chamber; and
means for repeating operations of conducting the series of measurements of communication performance and rotating the wireless device to the new angular orientation for the one or more angular orientations.

19. The wireless device testing apparatus of claim 18, wherein the series of measurements of communication performance comprise a series of measurements of multiple input multiple output (MIMO) throughput, and means for comparing the measurements of communication performance to one or more threshold criteria comprises means for performing one or more of:

comparing a standard deviation of the measurements of MIMO throughput to a pass/fail threshold;
comparing a minimum of the measurements of MIMO throughput to a pass/fail threshold;
comparing a mean of the measurements of MIMO throughput to a pass/fail threshold;
determining a cumulative density function from the measurements of MIMO throughput and determining whether the wireless device can statistically achieve a MIMO throughput better than a threshold percentage of a maximum throughput;
determining whether a number of communication link/beam failure events that occurred between rotations of the wireless device exceeds a threshold number; or
determining a distribution of a difference between MIMO throughput before and after rotations of the wireless device to a new angular orientation with respect to the antenna within the test chamber.

20. The wireless device testing apparatus of claim 18, wherein the series of measurements of communication performance comprise a series of measurements of link quality, and means for comparing the measurements of communication performance to one or more threshold criteria comprises means for performing one or more of:
comparing an absolute accuracy for link quality measurements to a pass/fail threshold;
comparing a standard deviation of the measurements of link quality to a pass/fail threshold;
comparing a minimum of the measurements of link quality to a pass/fail threshold;
comparing a mean of the measurements of link quality to a pass/fail threshold;
determining a cumulative density function from the measurements of link quality and determining whether the wireless device can statistically achieve link quality better than a threshold percentage of a maximum link quality;
determining whether a number of communication link/beam failure events that occurred between rotations of the wireless device exceeds a threshold number; or
determining a distribution of a difference between link quality measured before and after rotations of the wireless device to a new angular orientation with respect to the antenna within the test chamber.

21. The wireless device testing apparatus of claim 17, further comprising:
means for conducting an attachment procedure on the wireless device to establish an initial antenna beam between the wireless device and the antenna within the test chamber, wherein the attachment procedure is conducted with the wireless device at a first angular orientation of the one or more angular orientations, wherein the first angular orientation comprises a first angle associated with a first axis of the wireless device, and wherein the means for determining the measurements of communication performance of the wireless device at each angular orientation of the one or more angular orientations of the wireless device with respect to the antenna within the test chamber comprises:
means for conducting a series of measurements of communication performance of the wireless device at a second angular orientation of the one or more angular orientations, wherein the second angular orientation comprises a second angle associated with the first axis that is different from the first angle, and wherein the means for conducting the series of measurements of communication performance of the wireless device at the second angular orientation is based at least in part one or more initialization operation parameters determined from the attachment procedure conducted with the wireless device at the first angular orientation.

22. The wireless device testing apparatus of claim 21, wherein the first axis a zenith axis.

23. The wireless device testing apparatus of claim 17, further comprising:
means for rotating the wireless device to a new angular orientation with respect to the antenna within the test chamber without measuring communication performance in response to determining that an angular orientation of the wireless device with respect to the antenna within the test chamber is not a valid test orientation of the set of valid test orientations.

24. The wireless device testing apparatus of claim 21, further comprising:
means for determining that a series of measurements of communication performance of the wireless device was obtained with the wireless device in an invalid test orientation with respect to the antenna; and
means for not considering the series of measurements of communication performance of the wireless device taken in the invalid test orientation.

25. One or more non-transitory computer-readable media comprising executable instructions that, when executed by one or more processors of a computing device of a wireless device testing apparatus, cause the wireless device testing apparatus to perform operations comprising:
performing pretesting of a wireless device to determine a set of valid test orientations, wherein a corresponding valid test orientation of the set of valid test orientations is based at least in part on a testing performance reliability associated with a corresponding beam generated by the wireless device during the pretesting;
determining measurements of communication performance of a wireless device at one or more angular orientations of the wireless device with respect to an antenna within a test chamber, wherein each angular orientation of the one or more angular orientations corresponds to a valid test orientation of the set of valid test orientations; and
determining whether the wireless device satisfies beam forming performance requirements by comparing the measurements of communication performance to one or more threshold criteria.

26. The one or more non-transitory computer-readable media of claim 25, wherein the executable instructions, when executed by the one or more processors of the computing device, are configured to cause the wireless device testing apparatus to perform operations such that determining measurements of communication performance of the wireless device at one or more angular orientations of the wireless device with respect to an antenna within a test chamber comprises:
conducting a series of measurements of communication performance of the wireless device at a given angular orientation of the wireless device with respect to the antenna within the test chamber;
rotating the wireless device to a new angular orientation with respect to the antenna within the test chamber; and
repeating the operations of conducting the series of measurements of communication performance and rotating the wireless device to the new angular orientation for the one or more angular orientations.

27. The one or more non-transitory computer-readable media of claim 26, wherein the executable instructions, when executed by the one or more processors of the computing device, are configured to cause the wireless device testing apparatus to perform operations such that:
the series of measurements of communication performance comprise a series of measurements of multiple input multiple output (MIMO) throughput; and
comparing the measurements of communication performance to one or more threshold criteria comprises one or more of:
comparing a standard deviation of the measurements of MIMO throughput to a pass/fail threshold;
comparing a minimum of the measurements of MIMO throughput to a pass/fail threshold;
comparing a mean of the measurements of MIMO throughput to a pass/fail threshold;
determining a cumulative density function from the measurements of MIMO throughput and determining whether the wireless device can statistically achieve a MIMO throughput better than a threshold percentage of a maximum throughput;
determining whether a number of communication link/beam failure events that occurred between rotations of the wireless device exceeds a threshold number; or
determining a distribution of a difference between MIMO throughput before and after rotations of the wireless device to a new angular orientation with respect to the antenna within the test chamber.

28. The one or more non-transitory computer-readable media of claim 26, wherein the executable instructions, when executed by the one or more processors of the computing device, are configured to cause the wireless device testing apparatus to perform operations such that:
the series of measurements of communication performance comprise a series of measurements of link quality; and
comparing the measurements of communication performance to one or more threshold criteria comprises one or more of:
comparing an absolute accuracy for link quality measurements to a pass/fail threshold;
comparing a standard deviation of the measurements of link quality to a pass/fail threshold;
comparing a minimum of the measurements of link quality to a pass/fail threshold;
comparing a mean of the measurements of link quality to a pass/fail threshold;
determining a cumulative density function from the measurements of link quality and determining whether the wireless device can statistically achieve link quality better than a threshold percentage of a maximum link quality;
determining whether a number of communication link/beam failure events that occurred between rotations of the wireless device exceeds a threshold number; or
determining a distribution of a difference between link quality measured before and after rotations of the wireless device to a new angular orientation with respect to the antenna within the test chamber.

29. The one or more non-transitory computer-readable media of claim 26, wherein the executable instructions, when executed by the one or more processors of the computing device, are configured to cause the wireless device testing apparatus to perform operations further comprising:
conducting an attachment procedure on the wireless device to establish an initial antenna beam between the wireless device and the antenna within the test chamber, wherein the attachment procedure is conducted with the wireless device at a first angular orientation of the one or more angular orientations, wherein the first angular orientation comprises a first angle associated with a first axis of the wireless device, and wherein the executable instructions, when executed by the one or more processors of the computing device, are configured to cause the wireless device testing apparatus to perform operations such that determining the measurements of communication performance of the wireless device at each angular orientation of the one or more angular orientations of the wireless device with respect to the antenna within the test chamber comprises:
conducting a series of measurements of communication performance of the wireless device at a second angular orientation of the one or more angular orientations, wherein the second angular orientation comprises a second angle associated with the first axis that is different from the first angle, and wherein the conducting the series of measurements of communication performance of the wireless device at the second angular orientation is based at least in part one or more initialization operation parameters determined from the attachment procedure conducted with the wireless device at the first angular orientation.

30. The one or more non-transitory computer-readable media of claim 29, wherein the first axis a zenith axis.

31. The one or more non-transitory computer-readable media of claim 29, wherein the executable instructions, when executed by the one or more processors of the computing device, are configured to cause the wireless device testing apparatus to perform operations further comprising:
rotating the wireless device to a new angular orientation with respect to the antenna within the test chamber without measuring communication performance in response to determining that an angular orientation of the wireless device with respect to the antenna within the test chamber is not a valid test orientation of the set of valid test orientations.

32. The one or more non-transitory computer-readable media of claim 29, wherein the executable instructions, when executed by the one or more processors of the computing device, are configured to cause the wireless device testing apparatus to perform operations further comprising:
determining that a series of measurements of communication performance of the wireless device was obtained with the wireless device in an invalid test orientation with respect to the antenna; and
not considering the series of measurements of communication performance of the wireless device taken in the invalid test orientation.

* * * * *